United States Patent [19]
Perry

[11] 3,788,283
[45] Jan. 29, 1974

[54] DUAL FUEL SYSTEM
[75] Inventor: James C. Perry, Almont, Mich.
[73] Assignee: General Motors Corporation, Detroit, Mich.
[22] Filed: Oct. 27, 1972
[21] Appl. No.: 301,653

[52] U.S. Cl................. 123/3, 123/133, 123/179 G, 123/180 R, 123/127
[51] Int. Cl.. F02b 51/00, F02m 33/00, F02n 17/04
[58] Field of Search.........123/3, 133, 180 R, 179 G, 123/122 E, 34 R, 34 A, 35, 127

[56] References Cited
UNITED STATES PATENTS
2,625,920  1/1953  Farrell ............................... 123/133
2,884,917  5/1959  Quinby ............................... 123/133
3,498,279  3/1970  Seeley, Jr ......................... 123/122 F
3,688,755  9/1972  Grayson et al........................... 123/3

Primary Examiner—Al Lawrence Smith
Assistant Examiner—W. H. Rutledge, Jr.
Attorney, Agent, or Firm—J. L. Carpenter et al.

[57] ABSTRACT

A dual fuel system for an internal combustion engine having a carburetor supplied with high volatility fuel for engine starting and then with regular fuel for continued normal engine operation, an on board still being used to distill the high volatility fuel from the regular fuel during engine operation, the thus distilled fuel being stored for use during the next engine start-up.

3 Claims, 4 Drawing Figures

PATENTED JAN 29 1974 3,788,283

DUAL FUEL SYSTEM

This invention relates to a fuel system for internal combustion engines and, in particular, to a dual fuel system for selectively supplying a high volatility fuel and a regular fuel to an engine with on board partial distillation of the regular fuel to provide a high volatility or low emissions starting fuel.

It is well known that the use of a high volatility fuel in an internal combustion engine during engine start-up will permit faster engine starting due to more rapid vaporization of such high volatility fuel in the induction system of the engine and the use of such a fuel will reduce cold start exhaust emissions as compared to the use of a regular fuel such as gasoline in the engine during cold starts. However, the continued use of such a high volatility fuel in the engine after engine warm-up is normally not practical due to economic considerations, the use of regular gasoline in a conventional fuel system being preferred for continued engine operation. Because of this, various dual fuel systems have been proposed in the past wherein high volatility fuels are used for engine start-up and a conventional fuel used for continued engine operation, but such systems have been somewhat complex and very costly.

It is therefore the primary object of this invention to improve a fuel system for an internal combustion engine in which two fuels are selectively supplied to the engine as required with both fuels being obtained from a single fuel inlet.

Another object of this invention is to improve a dual fuel system for an internal combustion engine wherein partial distillation of a conventional gasoline occurs during engine operation to provide a high volatility, low emission starting fuel for the engine.

These and other objects of the invention are attained by a dual fuel system for the internal combustion engine of a vehicle wherein a distillation unit is used to partially distill regular gasoline using heat from the engine, the thus distilled high volatility fuel being stored and then selectively pumped to the float bowl of the engine carburetor for use during engine start-up after which regular gasoline from the fuel reservoir for the engine is used to effect continued operation of the engine.

For a better understanding of the invention, as well as other objects and further features thereof, reference is had to the following detailed description of the invention to be read in connection with the accompanying drawings, wherein.

Figure 1:
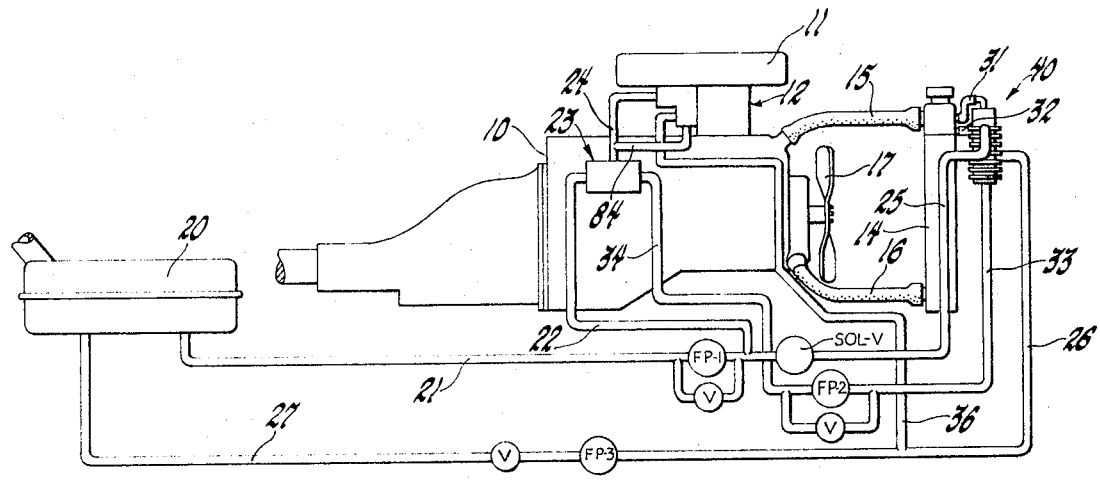
FIG. 1 illustrates schematically the internal combustion engine of a vehicle, fuel being supplied to the engine by a dual fuel system in accordance with the invention.
Figure 2:
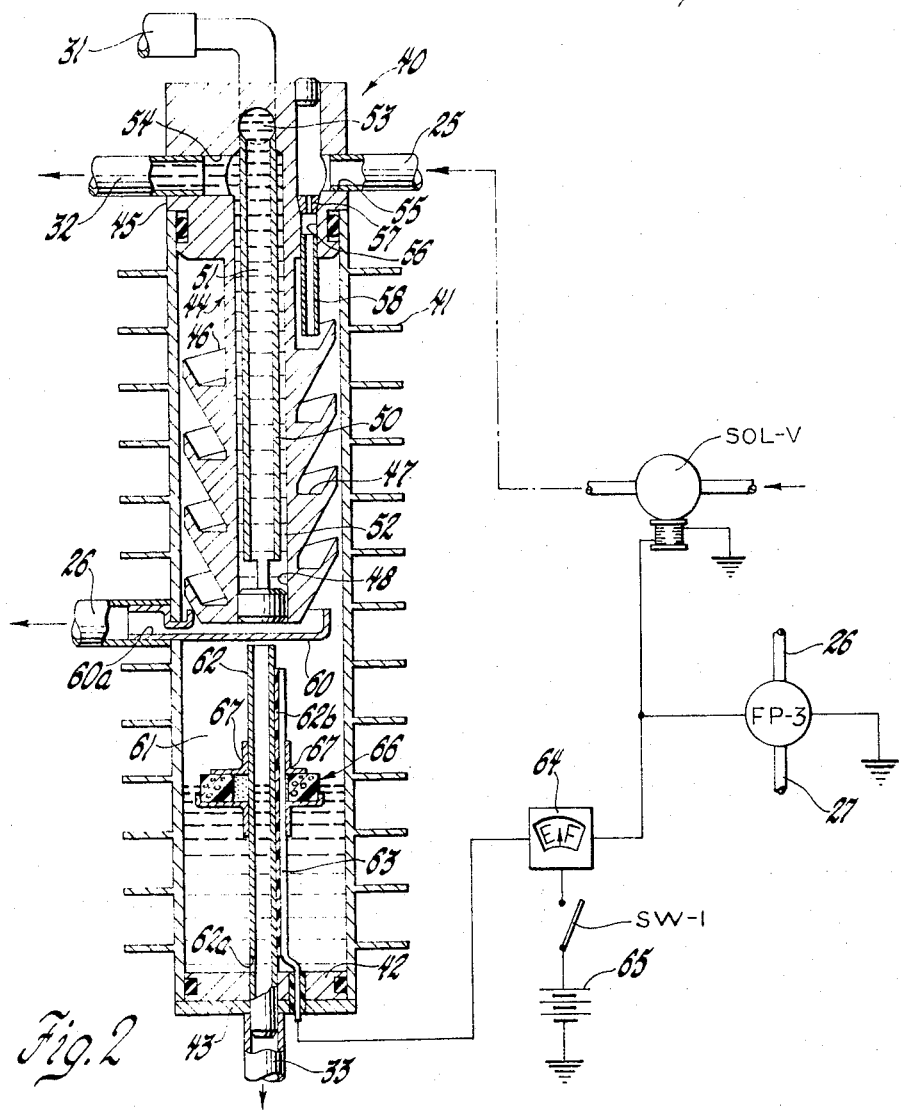
FIG. 2 is a sectional view of the distillation apparatus of the dual fuel system of FIG. 1 with the fuel flow control system to it shown schematically.

Referring now to FIG. 1, reference character 10 designates an internal combustion engine of a vehicle having an air cleaner 11 and carburetor 12 mounted thereon for supplying an air-fuel mixture to the induction passages of the engine. As shown, the engine is provided with a cooling system including a radiator 14 connected by an intake hose 15 to receive engine-heated coolant fluid, such as water, which is cooled during its passage through the radiator and then is discharged back through a conduit 16 to the engine 10, in a conventional manner.

Now, in accordance with the invention, dual fuels are supplied to the engine 10 from a single source of fuel, such as from regular fuel contained in a fuel tank or reservoir 20. Regular fuel, such as gasoline, is supplied to the engine from the fuel reservoir 20 via a conduit 21, a fuel pump FP-1 and a conduit 22 through a shuttle valve 23 and conduit 24 to the float bowl 21a of the carburetor 12. Regular fuel is also supplied through the fuel pump FP-1 and through a conduit 25 as controlled by a solenoid valve SOL-V therein to the inlet of a distillation unit 40, wherein partial distillation of the fuel produces a high volatility fuel, with the fuel remaining after the distillation of the high volatility components therefrom being returned via a conduit 26, fuel pump FP-3 and conduit 27 back to the fuel reservoir 20. The heat necessary to effect distillation of the fuel within the distillation unit 40 is obtained from the heated fluid discharged into radiator 14, this fluid passing via conduit 31 to the distillation unit and is returned from the distillation unit back to the radiator via conduit 32.

High volatility fuel produced in the distillation unit 40 is stored in the bottom thereof and delivered to the float bowl of the carburetor for use during engine start-up through a conduit 33, fuel pump FP-2 and conduit 34 as controlled by the shuttle valve 23 which controls the flow of selected fuel through the conduit 24 into the float bowl 12a of the carburetor. As will be described in greater detail hereinafter, to permit the use of only high volatility fuel during engine start-up, regular fuel is drained from the float bowl of the carburetor, after engine shutdown, through a conduit 36 connected to the previously described return fuel conduit 26.

Distillation unit 40, which is mounted in air flow relationship to the radiator for cooling by air drawn thereover by engine fan 17 includes an outer finned condenser tube housing 41 closed at its bottom end by an apertured base plug 42 and apertured cap 43, the latter being secured to the tube housing as by a welding. In the upper end of the tube housing, there is positioned a fuel evaporation unit in the form of a boiler body, generally designated 44, having a stepped plug portion 45 closing off the upper end of the tube housing and, having its depending boiler portion 46 extending partway through the tube housing, the boiler portion 46 being provided with a helical groove 47 gasoline flow path on the exterior thereof. The boiler body is provided with an axial extending, internal, stepped bore 48 in which a fluid inlet tube 50 is secured as at the reduced end of the stepped bore 48 to define with the stepped bore a hot fluid inlet passage 51 down through the boiler within the inlet tube and a return passage 52 defined by the outer periphery of the inlet tube 50 and the enlarged bore wall of the stepped bore 48. Hot fluid is admitted into the inlet passage from conduit 31 via a radial passage 53 in the plug portion 45 of the boiler body 44 in communication with the upper end of the inlet tube 50 and this fluid is then discharged to the conduit 32 via a radial passage 54 within this plug portion in communication with the enlarged portion of the stepped bore 48 whereby hot fluid, as from the radiator, at for example a temperature of 180° F. is introduced into the boiler body for circulation therein so as to vaporize the high volatility components of the gasoline flowing down the helical groove 47 gasoline flow path on the exterior of this boiler body.

Liquid gasoline delivered to the distillation unit 40 via the conduit 25 as controlled by the solenoid valve SOL-V flows through a radial passage 55 in the plug portion 45 of the boiler body 44 to which conduit 25 is suitably secured and then down through an axial extending passage 56 with flow therethrough controlled by a metering orifice 57 of a predetermined size and then through a splash tube 58 positioned in the passage downstream of the metering orifice, the lower end of the splash tube 58 being positioned closely adjacent to the upper portion of the helical groove 47 gasoline flow path whereby liquid gasoline discharged therefrom will flow down the helical groove flow path in heat exchange relationship to the coolant liquid being circulated within the boiler body.

Since this circulating coolant fluid is introduced at a temperature of, for example, 180° F. and since the liquid gasoline consists of various mixtures of gasoline components which boil within an approximate range of 95° F. for pentane to about 450° F. for hendecane, the higher volatility components of the gasoline will vaporize as the gasoline flows down over the flow path on the exterior of the boiler body, while the non-vaporized or undistilled fuel will be discharged from the flow path into a drip pan 60 positioned within the tube housing 41 below the boiler body 44, this drip pan being provided with a discharge duct 60a connected to conduit 26 whereby this fuel is returned to the fuel reservoir 20 by the fuel pump FP-3.

The higher volatility fuel thus vaporized, as described above, will then contact the interior wall surface of the finned condenser tube housing 41 to be cooled thereby to condense as a liquid distillate on this surface and flow down to the lower or reservoir portion 61 of the condenser tube housing defined as the chamber therein between the base plug 42 and the drip pan 60.

Detection of the amount of distillate, in the form of high volatility fuel, in the reservoir portion 61 of the distillation unit 40 is accomplished by a conventional fuel tank fuel gauge. For this purpose, a float guide tube 62 is secured to extend upward through the apertures in the base plug 42 and cap 43 and it is provided with a fluid discharge port 62a in the wall thereof positioned closely adjacent to the base plug 42 and has its lower end, which extends outward from cap 43, connected to the conduit 33.

The guide tube 62 has a calibrated resistance wire 63 mounted along the exterior length thereof, the resistance wire being insulated with respect to the guide tube by insulating material 62b and is electrically connected to a conventional electrically operated fuel level indicator 64, the fuel level indicator also being connected in an electrical circuit with a suitable source of electrical power, such as the vehicle battery 65, through an ignition switch SW-1 and to the solenoid valve SOL-V and to the fuel pump FP-3.

Slidably encircling the float guide tube is a ring-type float 66 carrying thereon electrical wiper contacts 67 connected together by a conductor not shown. One contact 67 contacts the resistance wire 63 and the other contacts the float guide tube 62. The amount of resistance in this circuit is directly proportional to the level of liquid in this reservoir.

This portion of the electrical circuit of the dual fuel system is such that, assuming ignition switch SW-1 is closed, when the level of the high volatility fuel distillate in the reservoir portion 61 of the distillation unit 40 is below a set level position, as sensed by the wiper contact 67 on the float 66 engaging the calibrated resistance wire 63, the electrical circuit is completed through the fuel level indicator 64, in a known manner, to energize the solenoid valve SOL-V so that with the fuel pump FP-1 in operation, fuel is continuously supplied to the distillation unit and, at the same time, the fuel pump FP-3 is energized to pump the fuel discharged through conduit 26 from the distillation unit back to the fuel reservoir 20. As the float 66 with the wiper contact 67 thereon reaches a predetermined position to indicate that the reservoir unit is full of liquid high volatility fuel, the solenoid valve SOL-V is de-energized, as is the fuel pump FP-3. Since the solenoid valve SOL-V is a normally closed valve, the de-energization of this valve will block the flow of raw fuel to the distillation unit 40 until such time as the liquid level of the high volatility fuel within this unit again drops below the full fuel distillate level. Fuel pump FP-3 is used to ensure positive return of the undistilled fuel to the fuel reservoir 20.

Figure 3:
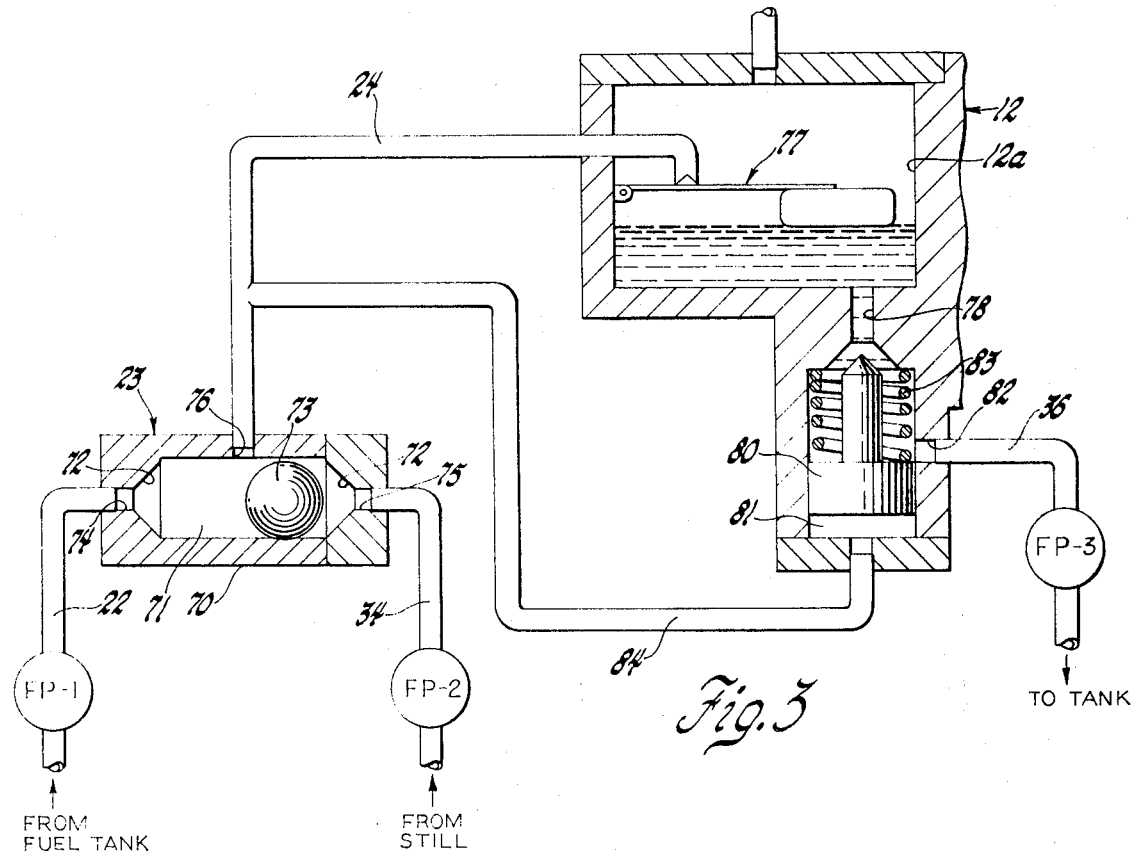
FIG. 3 is a schematic illustration of the carburetor float bowl fuel supply and drainage system of FIG. 1; and, FIG. 4 is a schematic diagram of the electrical control circuit of the dual fuel system of FIG. 1.

Referring now to FIG. 3, the float bowl 12a of the carburetor is supplied with regular fuel either directly from the fuel tank 20 through conduit 22 or with high volatility fuel from the distillation unit 40 through conduit 34 as controlled by the shuttle valve 23. The shuttle valve 23 may be of any suitable type and, in the embodiment illustrated, includes a housing 70 having an elongated chamber 71 therein, the opposite end walls of the housing being curved to provide valve seats 72 for a ball 73 loosely movable in the chamber 71 to selectively control the flow through either the inlet passage 74 in the valve housing connected to the conduit 22 or through the inlet passage 75 connected to conduit 34, with discharge from the chamber 71 being through a centrally located discharge port 76 connected by the conduit 24 to the float 12a of the carburetor, fuel flow into the float bowl being controlled by a conventional float valve 77 therein. Whenever fuel under pressure is introduced at one of the inlet passages 74 or 75, the ball 73 will move to the other end of chamber 71 to seal off the other inlet passage and to permit flow of fuel through discharge port 76.

In addition, a float bowl drain system is provided for the carburetor 12 and in the embodiment disclosed includes a drain passage 78 extending from the bottom of the float bowl into a piston-type valve 80 controlled piston chamber 81 in the body of the carburetor with liquid flow therefrom through a passage 82 connected to the conduit 36 to permit the return of fuel drained from the float bowl 12a to the fuel tank 20. Flow through the drain passage 78 is controlled by valve 80 slidably mounted in the chamber 81 and which is normally biased out of engagement with the valve seat surrounding the drain passage 78 by a coiled spring 83. The valve 80 is closed to block flow from the drain passage 78 by fuel pressure supplied to the piston portion of the valve 80 through a conduit 84 operatively connected at one end to the piston chamber and its other end to the conduit 24 whereby, as fuel is being supplied to the float bowl via the fuel pumps FP-1 or FP-2 through the shuttle valve 23 and conduit 24, this fuel under pressure will pass through the conduit 84 and force the valve 80 into position to block flow of fuel from drain passage 78 whereby, as long as fuel is being supplied under pressure to the float bowl 12a of the carburetor, draining of fuel from the float bowl will be prevented.

Figure 4:
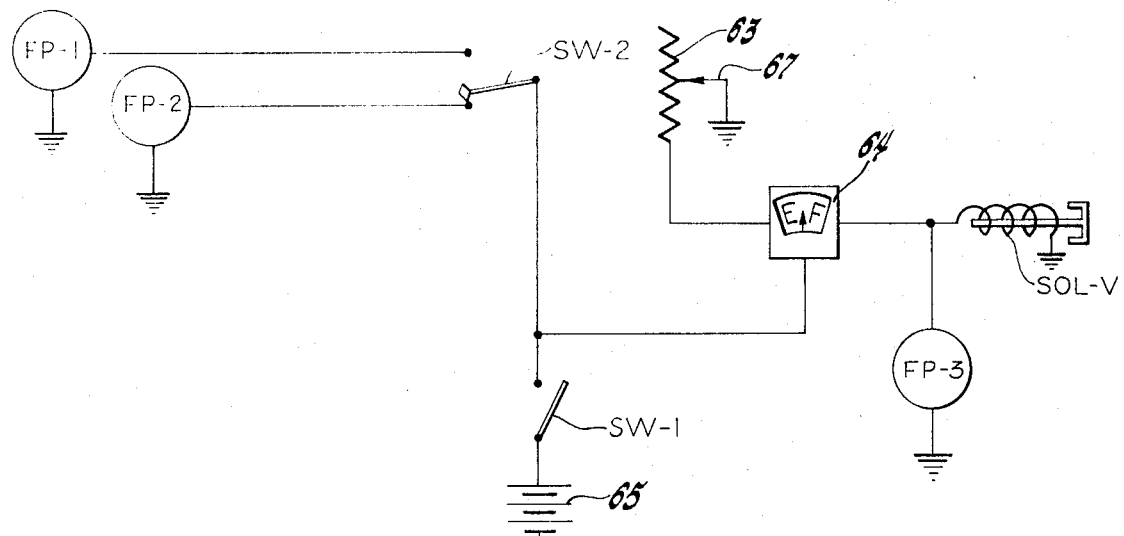

A clearer understanding of the operation of the dual fuel system for supplying fuel to the engine 10 and of the electrical circuit controlling the various elements of this system can best be obtained by reference to the schematic wiring diagram of FIG. 4. When the ignition switch SW-1 is closed, electrical power from the battery 65 is directed to a snap action temperature switch SW-2 which is suitably immersed, not shown, in the engine coolant fluid in engine 10. If the coolant temperature is below a predetermined temperature, for example 140° F., the temperature switch SW-2 directs electrical power to the fuel pump FP-2 so that this pump is operative to pump high volatility fuel from the reservoir of the distillation unit 40 through the shuttle valve 23 and into the float bowl 12a of carburetor 12 for use in engine 10. When the coolant temperature reaches the above-identified predetermined temperature, the temperature switch SW-2 then snaps to its alternate position directing electrical power to the fuel pump FP-1 while, of course, at the same time de-energizing fuel pump FP-2 and this pump stops pumping. Accordingly, the fuel pump FP-1 then pumps regular fuel from the fuel reservoir 20 to the float bowl of the carburetor through shuttle valve 23 so that the switch is then made from the use of high volatility fuel to the use of normal fuel in engine 10 for continued operation of the engine, the fuel pump FP-1 also being used to pump raw fuel to the distillation unit 40 in the manner previously described.

Also, as previously described, during engine operation with the ignition switch SW-1 closed, the fuel pump FP-3 is operated when the distillation unit 40 is in operation to pump undistilled fuel from this unit back to the fuel reservoir 20.

When the ignition switch SW-1 is opened, both fuel pumps FP-1 and FP-2, used in the manner described above to supply fuel to the carburetor, cease pumping and the fuel pressure closing the float bowl drain valve 80 will reduce to nearly zero pounds per square inch gauge pressure thus permitting the spring 83 to effect unseating of the valve 80 to permit draining of fuel from the float bowl 12a through the drain passage 78 into conduit 36 for return to the fuel reservoir 20. With the float bowl 12a empty of fuel, when the ignition switch SW-1 is again closed, either fuel pump FP-1 or FP-2 will be energized, depending on coolant temperature as sensed by the temperature switch SW-2, to pump fuel through the shuttle valve 23 to fill the float bowl 12a with fuel.

What is claimed is:

1. A dual fuel system for an internal combustion engine having a cooling system containing coolant fluid heated during engine operation and a fuel induction system including a carburetor having a float bowl, said dual fuel system including a fuel reservoir for regular fuel, valve means having a first inlet, a second inlet and a discharge port, a conduit connecting said discharge port of said valve means to the float bowl of the carburetor, a distillation unit including a condenser tube housing having cooling fins on the exterior thereof, a fuel evaporation unit, having an outer, helical fuel flow path, positioned in the upper end of said condenser tube housing and spaced from the bottom thereof to provide a reservoir for a distillate therein, an undistilled fuel collecting means positioned in said condenser tube housing beneath said fuel evaporation unit for collecting undistilled fuel flowing from said fuel evoparation unit, first conduit means including a first pump means connecting said fuel reservoir to said first inlet of said valve means and to said fuel evaporation unit to supply fuel to said helical fuel flow path, second conduit means including a second pump means connected to said condenser tube housing in fluid flow communication with said distillate reservoir and to said second inlet of said valve means, third conduit means connecting said undistilled fluid collecting means to said fuel reservoir, passage means in said fuel evaporation unit for the circulation of coolant fluid therein in heat exchange relationship to said helical fuel flow path, conduit means connecting the cooling system of the engine to said passage means for recirculation of coolant fluid through said passage means, and temperature sensing control means operatively connected to said first pump means and said second pump means positioned in thermal relationship to the coolant fluid in the cooling system to selectively effect operation of said first pump means and said second pump means as a function of coolant temperature.

2. A dual fuel system according to claim 1 further including float bowl drain means having a drain conduit means connected at one end to the float bowl of the carburetor for draining fuel therefrom and connected at its opposite end to said third conduit means, and hydraulic controlled valve means positioned in said drain conduit means and operatively connected in fluid communication with said conduit and operative to prevent flow through said drain conduit means when fuel under pressure is being pumped through said conduit.

3. A dual fuel system according to claim 1 further including a distillate level sensing means operatively positioned in said distillate reservoir of said condenser tube housing and, valve means positioned in said first conduit means and operatively connected to said distillate level sensing means to control the flow of fuel to said fuel evaporation means as a function of the level of distillate in said reservoir as sensed by said distillate level sensing means.

* * * * *